(12) United States Patent
Jones et al.

(10) Patent No.: US 7,901,537 B2
(45) Date of Patent: Mar. 8, 2011

(54) LINER PANEL HAVING BARRIER LAYER

(75) Inventors: John M. Jones, Savannah, GA (US); Charles R. Fetz, Savannah, GA (US); Daniel J. McCormack, Rincon, GA (US); Maung Aye Than, Lafayette, IN (US); Melanie R. Tatum, Mooresville, NC (US)

(73) Assignee: Great Dane Limited Partnership, Chicago, IL (US)

( * ) Notice: Subject to any disclaimer, the term of this patent is extended or adjusted under 35 U.S.C. 154(b) by 264 days.

(21) Appl. No.: 11/685,401

(22) Filed: Mar. 13, 2007

(65) Prior Publication Data
US 2007/0163193 A1    Jul. 19, 2007

Related U.S. Application Data

(63) Continuation of application No. 10/645,920, filed on Aug. 20, 2003, now abandoned.

(51) Int. Cl.
*B32B 37/26* (2006.01)
*B32B 38/10* (2006.01)
*E04F 13/08* (2006.01)
*B29C 65/02* (2006.01)

(52) U.S. Cl. .......... 156/289; 156/300; 156/301; 156/302; 156/306.6; 156/308.2; 156/309.6; 296/181.1; 296/181.2; 296/181.3; 296/186.1; 296/187.01; 296/187.03; 296/191; 52/459; 52/471; 52/472

(58) Field of Classification Search .................. 156/289, 156/297–302, 306.6, 308.2, 309.6, 250, 267, 156/269; 296/181.1, 181.2, 181.3, 186.1, 296/187.01, 187.03, 191; 52/459, 471, 472
See application file for complete search history.

(56) References Cited

U.S. PATENT DOCUMENTS

| 3,393,920 | A | * | 7/1968 | Ehrlich ...................... 296/181.6 |
| 3,653,578 | A | * | 4/1972 | Wood ........................ 229/122.33 |
| 3,835,620 | A | * | 9/1974 | Boltz et al. ....................... 53/157 |
| 4,015,876 | A | * | 4/1977 | Hulverson et al. .......... 296/184.1 |
| 4,357,047 | A | * | 11/1982 | Katz ........................... 296/186.1 |
| 4,420,183 | A | * | 12/1983 | Sherman ....................... 296/39.1 |
| 4,438,160 | A | * | 3/1984 | Ishikawa et al. .............. 427/214 |
| 4,599,127 | A | * | 7/1986 | Cannady et al. ............... 156/289 |
| 4,687,428 | A | * | 8/1987 | Martin et al. ................... 425/60 |
| 4,689,102 | A | * | 8/1987 | Prawdzik et al. ............. 156/235 |
| 4,904,017 | A | * | 2/1990 | Ehrlich ...................... 296/186.1 |

(Continued)

OTHER PUBLICATIONS

"Van Bodies Many Details go Into the So-called Simple Box. Here are Some of Them." [Online], Newsport's Heavy Duty Trucking—The Business Magazine of Trucking. Retrieved from the Internet: http://www.heavydutytrucking.com/2004/05/090a0405.asp; retrieved on Jun. 13, 2007.

(Continued)

*Primary Examiner* — Philip C Tucker
*Assistant Examiner* — Sing P Chan
(74) *Attorney, Agent, or Firm* — Clark Hill PLC

(57) ABSTRACT

A cargo trailer includes a floor, a roof and a side wall extending vertically upward between the floor and roof. The side wall includes a substantially gas impermneable outer liner panel and a substantially gas impermeable inner liner panel. The inner liner panel includes at least one glass and polymer layer and one gas impermeable barrier layer. The inner liner panel can also be used to form the roof and replace the outer liner panel.

32 Claims, 14 Drawing Sheets

U.S. PATENT DOCUMENTS

| | | | | |
|---|---|---|---|---|
| 4,925,719 | A * | 5/1990 | Staneluis et al. | 428/71 |
| 4,940,279 | A * | 7/1990 | Abott et al. | 296/186.1 |
| 5,261,984 | A * | 11/1993 | Minnick et al. | 156/209 |
| 5,492,747 | A * | 2/1996 | Kemp et al. | 428/98 |
| 5,633,063 | A * | 5/1997 | Lause et al. | 428/71 |
| 5,664,826 | A * | 9/1997 | Wilkens | 296/186.1 |
| 5,698,304 | A * | 12/1997 | Brandon et al. | 428/215 |
| 5,860,693 | A * | 1/1999 | Ehrlich | 296/191 |
| 5,876,089 | A * | 3/1999 | Ehrlich | 296/186.1 |
| 5,992,117 | A * | 11/1999 | Schmidt | 52/582.1 |
| 6,054,205 | A * | 4/2000 | Newman et al. | 428/221 |
| 6,093,481 | A | 7/2000 | Lynn et al. | |
| 6,135,531 | A * | 10/2000 | Allen et al. | 296/39.1 |
| 6,156,682 | A * | 12/2000 | Fletemier et al. | 442/394 |
| 6,187,409 | B1 * | 2/2001 | Mathieu | 428/70 |
| 6,268,047 | B1 * | 7/2001 | Mulder et al. | 428/298.1 |
| 6,311,456 | B1 * | 11/2001 | Rodero Antunez | 52/794.1 |
| 6,497,451 | B1 * | 12/2002 | Jones et al. | 296/186.1 |
| 6,607,237 | B1 * | 8/2003 | Graaff et al. | 296/186.1 |
| 6,803,110 | B2 * | 10/2004 | Drees et al. | 428/423.7 |
| 6,832,808 | B1 * | 12/2004 | Bennett | 296/186.1 |
| 6,855,652 | B2 * | 2/2005 | Hable et al. | 442/226 |
| 6,872,673 | B2 * | 3/2005 | MacAulay | 442/152 |
| 6,979,051 | B2 * | 12/2005 | Jones et al. | 296/186.1 |
| 7,055,892 | B2 * | 6/2006 | Buchholz et al. | 296/186.1 |
| 7,244,501 | B2 * | 7/2007 | Raghavendran et al. | 428/412 |
| 2001/0046587 | A1 * | 11/2001 | Michael et al. | 428/137 |
| 2003/0159390 | A1 * | 8/2003 | Fonseca | 52/408 |
| 2004/0014382 | A1 | 1/2004 | Macaulay | |
| 2004/0231915 | A1 * | 11/2004 | Thompson et al. | 181/290 |
| 2005/0003224 | A1 * | 1/2005 | Haruyama | 428/540 |
| 2005/0042432 | A1 * | 2/2005 | Jones et al. | 428/292.1 |
| 2005/0217932 | A1 * | 10/2005 | Woodman et al. | 181/290 |
| 2006/0141884 | A1 * | 6/2006 | Haque | 442/361 |
| 2006/0240242 | A1 * | 10/2006 | Raghavendran et al. | 428/304.4 |
| 2007/0099524 | A1 * | 5/2007 | Porter | 442/38 |
| 2007/0110944 | A1 * | 5/2007 | Grandominico et al. | 428/57 |

OTHER PUBLICATIONS

"Liteply FRP/Plywood Panels" [Online], FTI. Retrieved from the Internet: http://www.fiber-tech.net/home.htm; retrieved on Jun. 13, 2007.

"FRP Plywood," APA The Engineered Wood Association, 1998.

PCT International Search Report of International Searching Authority for International Application No. PCT/US04/27110, Aug. 27, 2008, 5 pages.

Miller, R.C., Polypropylene, Plastics Handbook, 1994, 4 Pages, Edited by Modern Plastics Magazine, Wilmington, Delaware, USA.

* cited by examiner

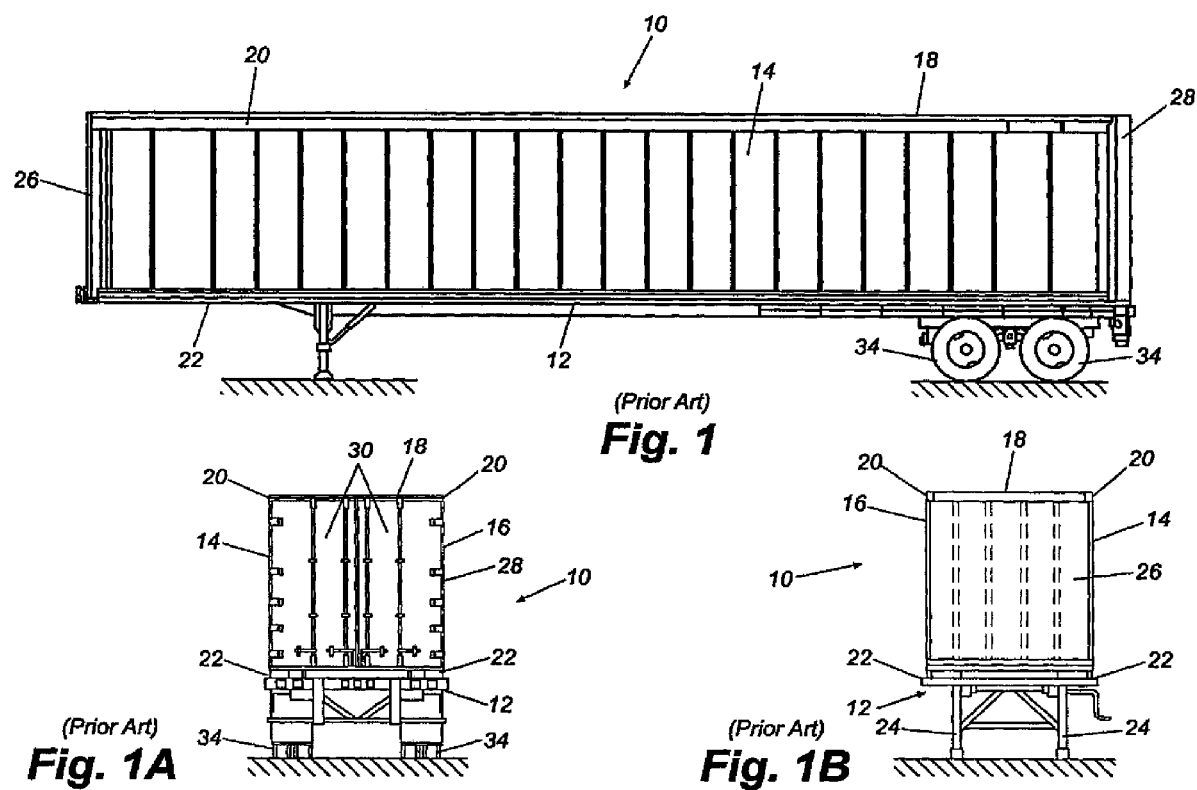

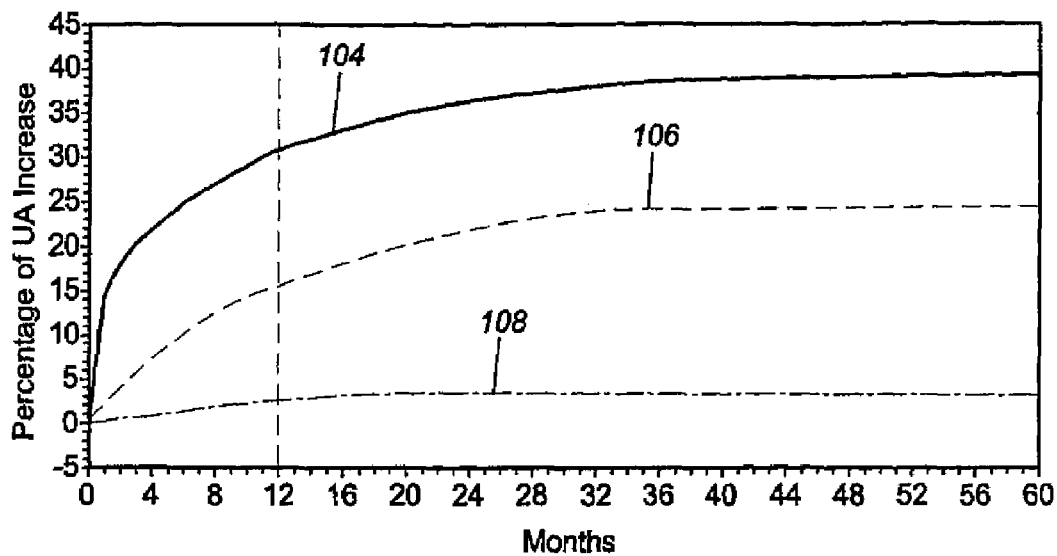
Fig. 4
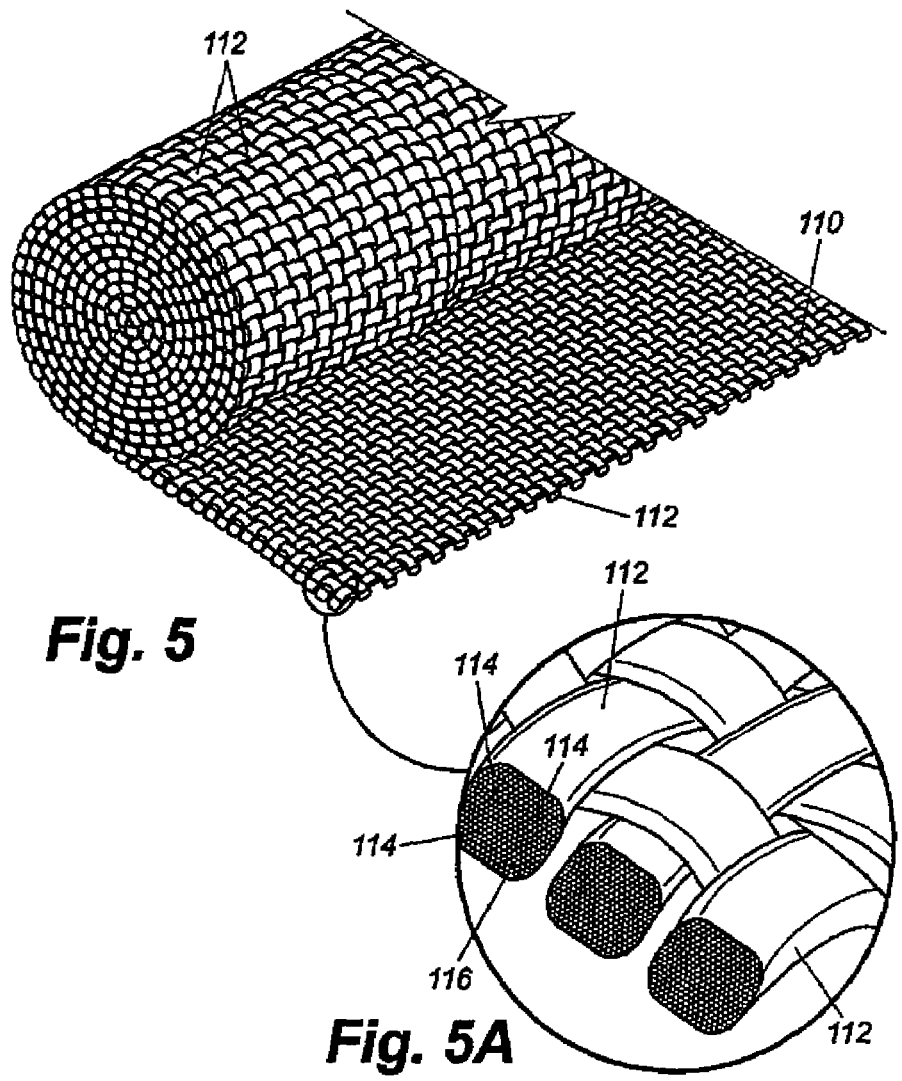
Fig. 5
Fig. 5A

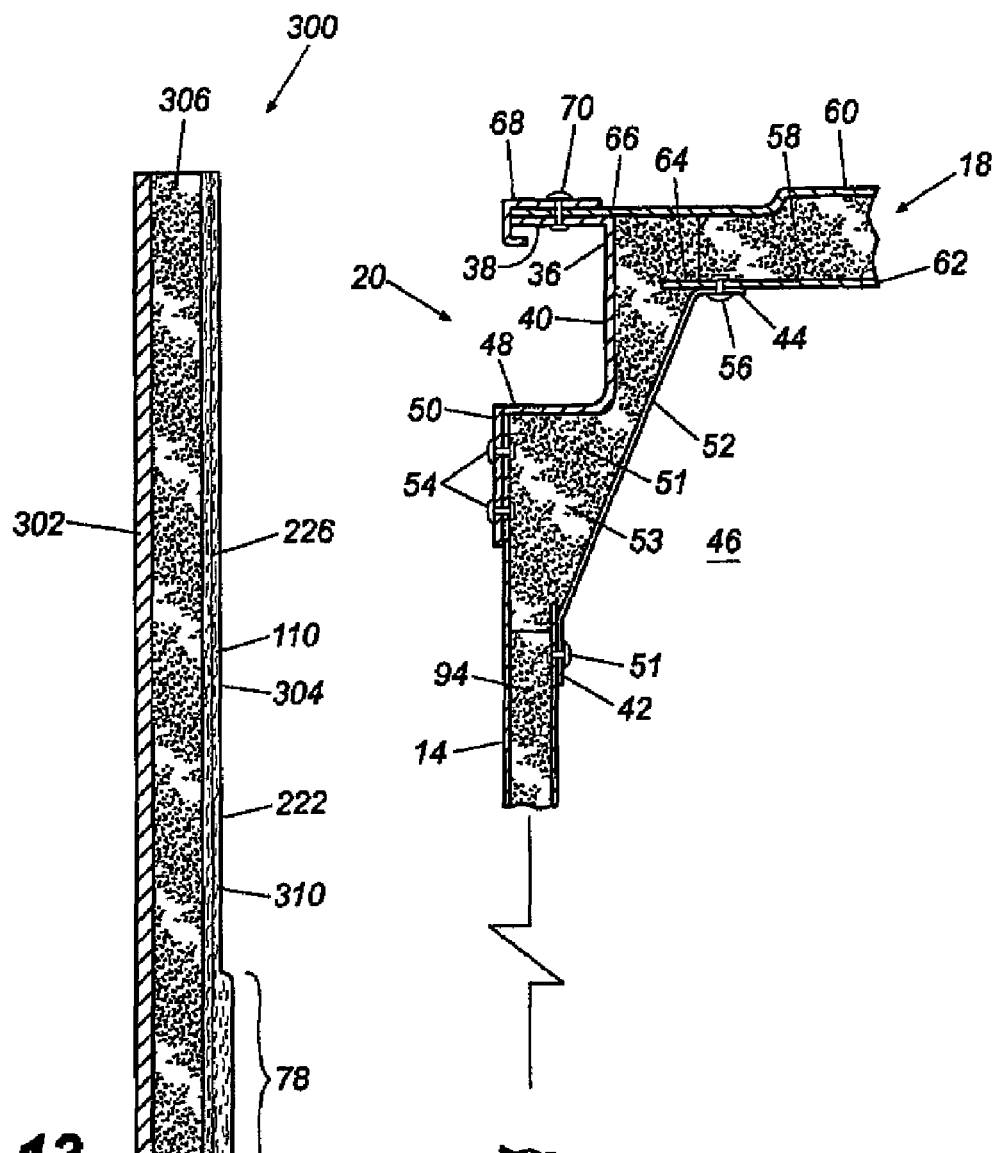
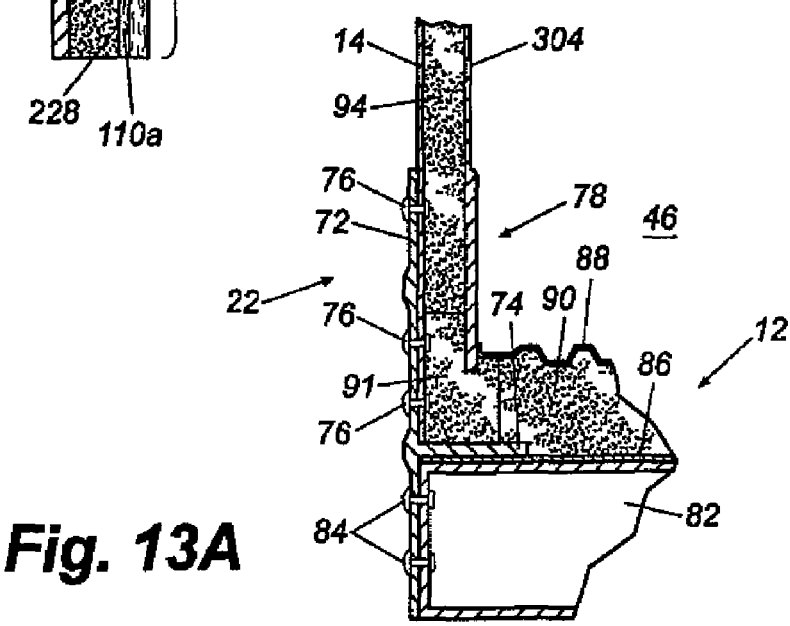
Fig. 13
Fig. 13A

US 7,901,537 B2

LINER PANEL HAVING BARRIER LAYER

CROSS REFERENCE TO RELATED APPLICATION

This application is a continuation of application Ser. No. 10/645,920, now abandoned filed Aug. 20, 2003, entitled: "LINER PANEL HAVING BARRIER LAYER".

FIELD OF THE INVENTION

The present invention relates to thermal-insulated walls and more particularly to a thermal-insulated wall having a gas impermeable composite liner panel.

BACKGROUND OF THE INVENTION

Thermal insulated cargo vehicles, such as van-type trailers, straight trucks (for example, trucks below Class 8 having bodies built onto truck chassis) and cargo containers, are known. In general, it is desirable that the bodies defining the cargo compartments of such vehicles have wall constructions that balance strength, rigidity and thermal performance. The present invention recognizes this need and provides a gas impermeable liner panel that reduces degradation of the thermal-insulating properties of a vehicle or other structure.

BRIEF SUMMARY OF THE INVENTION

The present invention recognizes and addresses considerations of prior art constructions and methods and provides a substantially gas impermeable composite liner panel for use in a thermal-insulated wall construction. The liner panel comprises at least one gas impermeable barrier layer and at least one structural polymer resin layer disposed coplanar and attached to the barrier layer to form a laminate liner panel. The polymer resin can be polypropylene, and the gas impermeable barrier layer can be a metallized polyester film. An adhesive film layer is placed intermediate the barrier layer and the at least one structural polymer resin layer to attach these layers together. The gas impermeable barrier layer could also be formed from metallized polypropylene film or metal foil. The liner panel can also include a scrim layer that provides a rough surface and a polypropylene film layer that provides a smooth finished surface. A second structural polymer resin layer can be added to the composite panel to provide increased thickness for added strength and toughness. The laminate can be used to form a thermal insulated wall having a polyurethane foamed gas impregnated.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 1 is a side elevation view of a prior art insulated cargo container and chassis that may be attached to a tractor for transport over a highway;

FIGS. 1A and 1B are respective rear and front elevation views of the prior art container and chassis of FIG. 1;

FIG. 4 is a graphical representation of thermal properties of different thermal container wall constructions;

FIG. 5 is a perspective view of a woven thermoplastic and glass composite material used to form a thermal wall in accordance with an embodiment of the present invention;

FIG. 5A is a detailed view of the thermoplastic material of FIG. 5;

FIG. 13 is a sectional elevation view of a thermal wall in accordance with an embodiment of the present invention;

FIG. 13A is a sectional elevation view of a side of a trailer including the thermal wall of FIG. 13;

Figure 1C:
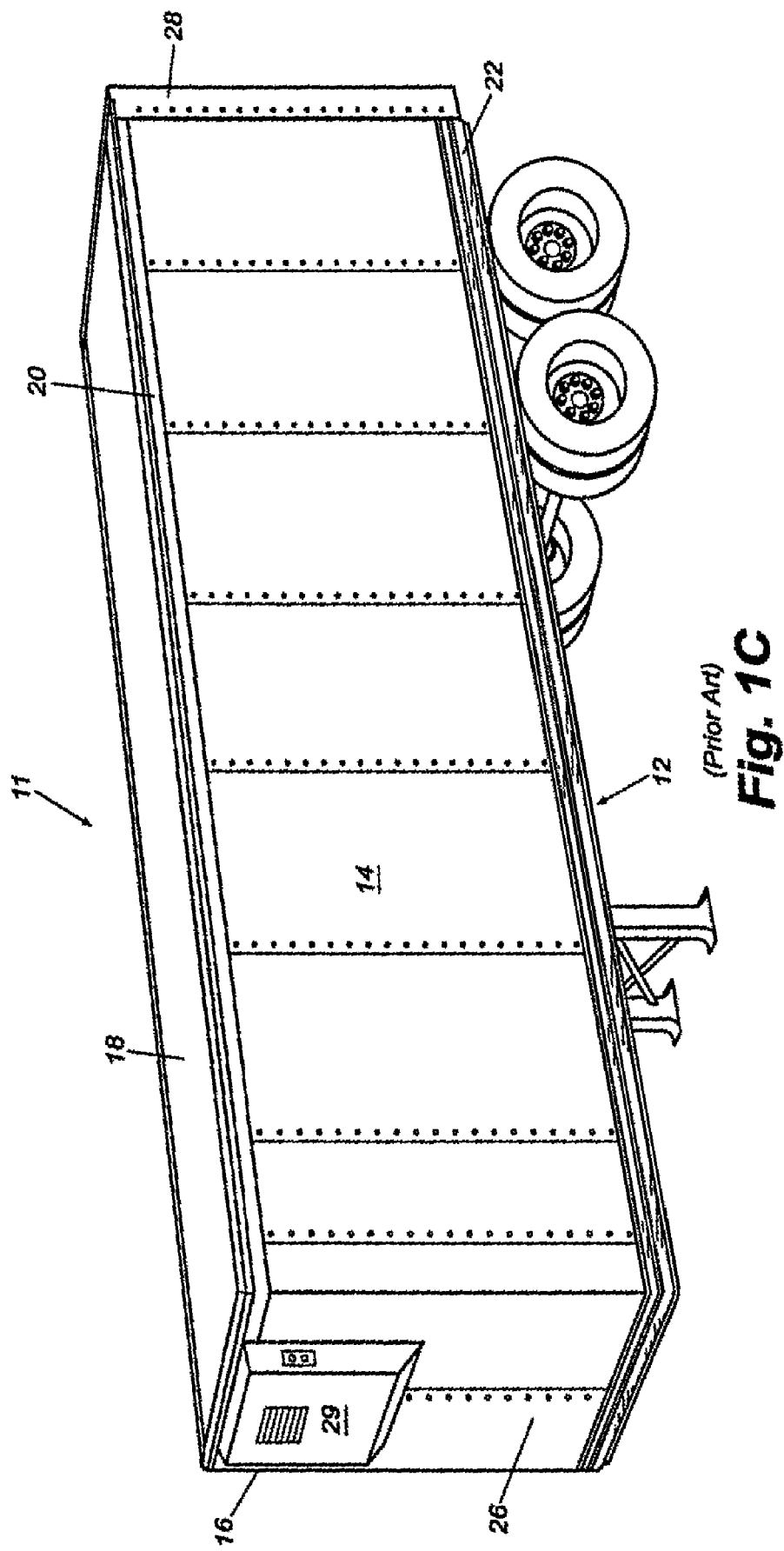
FIG. 1C is a perspective view of a prior art trailer that may be attached to a tractor for transport over a highway.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIGS. 1, 1A and 1B illustrate a prior art (insulated but not refrigerated as shown) cargo container 10 having a floor 12, two side walls 14 and 16 and a roof 18. Each side wall is identically constructed. Two top rails 20 attach roof 18 to side walls 14 and 16, respectively, and two bottom rails 22 connect floor 12 to the side walls. Once assembled, the roof, floor and side walls form a container having a generally rectangular cross-section when viewed from the rear (FIG. 1A). The distance between opposing inner surfaces of side walls 14 and 16 is generally greater than ninety inches, and the distance between outer surfaces of the opposing side walls is generally less than 110 inches.

The container includes a forward end wall 26 and a rearward end frame 28. Two doors 30 at the container's rearward end are pivotally connected to rear end frame 28. The container rests on a chassis formed by one or more longitudinal beams extending between retractable legs 24 and a plurality of axled wheels 34. The wheels support the container's rearward end, and facilitate the container's movement, when the container, supported by the chassis, is coupled to a tractor (not shown).

FIG. 1C illustrates a prior art refrigerated van type trailer 11 having a floor 12, two side walls 14 and 16 and a roof 18. Each side wall is identically constructed. Two top rails 20 attach roof 18 to side walls 14 and 16, respectively, and two bottom rails 22 connect floor 12 and the trailer's deck structure to the side walls. The trailer includes a forward wall 26 and a rearward end frame 28. Two doors (not shown) at the trailer's rearward end are pivotally connected to the rear end frame, although it should be understood that a roll-type door may also be used. As with container 10 (FIG. 1), the assembled trailer defines an interior cargo compartment defined by the assembled side walls, forward wall, rear doors and roof. The distance between opposing inner surfaces of side walls 14 and 16 is generally greater than ninety inches, and the distance between outer surfaces of the opposing side walls is generally less than 110 inches. A refrigeration unit 29 mounted in forward wall 26 outputs conditioned air to the interior cargo compartment. The terms "side wall," "front wall" and "rear door" are used separately in the present discussion for purposes of explanation, and it should be understood that the term "side wall," as used herein, may refer to any side wall, front wall or rear doors of an insulated or other structure.

Figure 2:
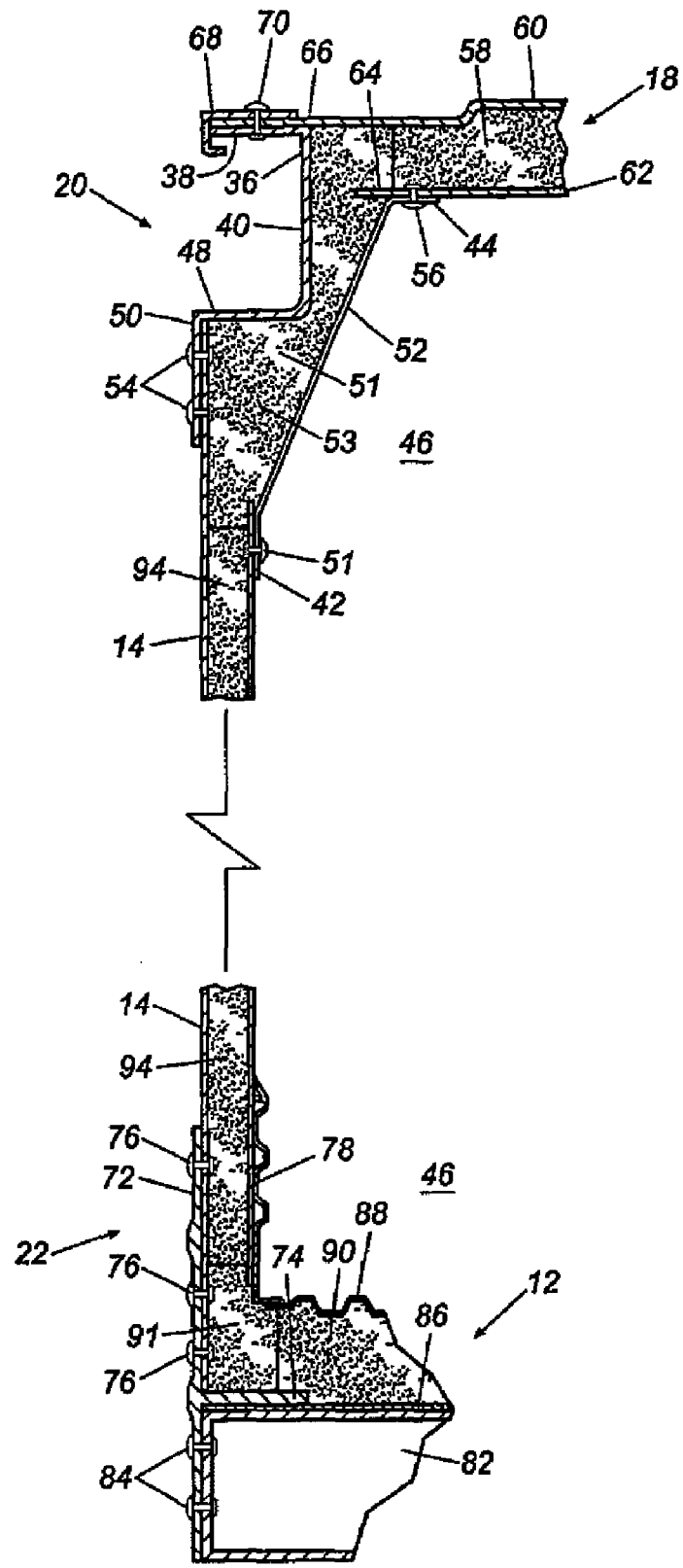
FIG. 2 is a sectional elevation view of a side of the prior art trailer of FIG. 1C.

The difference between a container and trailer is that the trailer has an integral chassis and suspension, and does not have frames that are configured to permit the lifting and stacking of the container, as should be understood in this art. In other words, as should be well understood in this art, the container is a box that is placed on and removably attached to the longitudinal I-beam type chassis, as shown in FIG. 1. FIG. 2 provides a partial sectional view of the roof, floor and one of the side walls of a thermal enclosure for use in forming container 10 or trailer 11.

Referring to FIG. 2, top rail 20 connects wall 14 to roof panel 18. Top rail 20 is formed from extruded aluminum and defines a U-shaped channel 36 having an upper flange 38 extending outwardly over a vertical leg 40 that extends from upper flange 38 to a lower horizontal flange 48. The terms "inward" and "outward," as used herein, are defined relative to the container's interior space indicated at 46. Moreover, the term "roof panel," as used herein may refer to a single continuous panel, or to a plurality of discrete panels that are attached together, that form the roof of trailer 10. Horizontal flange 48 extends outward from the lower edge of vertical leg 40, and a vertical leg 50 extends downward from flange 48. Side wall 14 is received against vertical leg 50 and is secured at 54 by screws, rivets, tapit pins, or any other suitable connection method. Roof panel 18 is secured to flange 38 at 70 by screws, rivets, tapit pins, or any other suitable connection method. An angled bracket 52 having mounting flanges 42 and 44 extends between an inner liner 62 of roof 18 and wall 14. Bracket 52 is secured to the wall at 51 and to the roof at 56 by screws, rivets, tapit pins, or any other suitable connection method. Once angled bracket 52 is secured in place, an insulating polyurethane rigid foam core 53 is forced into the channel formed between bracket 52 and rail 20 to insulate any voids between the roof core 58 and the wall core 94.

Roof panel 18 includes a thermoset plastic rigid urethane foam core 58 between upper and lower liner panels 60 and 62. Upper liner panel 60 may be formed by an aluminum sheet that is preferably about 0.040 inches thick, and lower layer 62 may be a thermoset fiberglass reinforced plastic sheet that is preferably about 0.080 inches thick. The lower liner panel has an extension 64 that extends beyond foam core 58 by about 0.50 inches, and the upper liner panel has an extension 66 that extends beyond the core by about 2.25 inches. Extension 64 abuts bracket 52, and upper liner panel extension 66 extends over and on rail flange 38. A cover 68 covers the edges of flange 38 and upper liner panel extension 66. Cover 68 and liner panel extension 66 are attached at 70 to flange 38 by screws, rivets, tapit pins, or any other suitable connection method. A sealant (not shown) may be placed over the rivet and seam locations to inhibit moisture intrusion into the inner foamed areas.

Bottom rail 22 connects side wall 14 to the floor system or deck structure and includes a vertical leg 72 and a horizontal leg 74. The rail may be formed from any suitable material such as extruded aluminum. A scuff plate 78 fits over the lower edge of wall 14, and the scuff plate bottom edge overlaps a corrugated floor surface 88. Wall 14 is fastened to vertical leg 72 at 76 by screws, rivets, tapit pins, or any other suitable connection method. A plurality of transverse cross members 82 (one of which is shown in FIG. 2) extend under the floor and are riveted or bolted to and between the two bottom rails 22 at 84. The transverse cross members, in conjunction with the wheels and retractable legs form the trailer s chassis. The floor includes an insulating polyurethane rigid foam core 90 disposed between a fiberglass sub-floor 86 and upper extruded aluminum decking 88.

Figure 3:
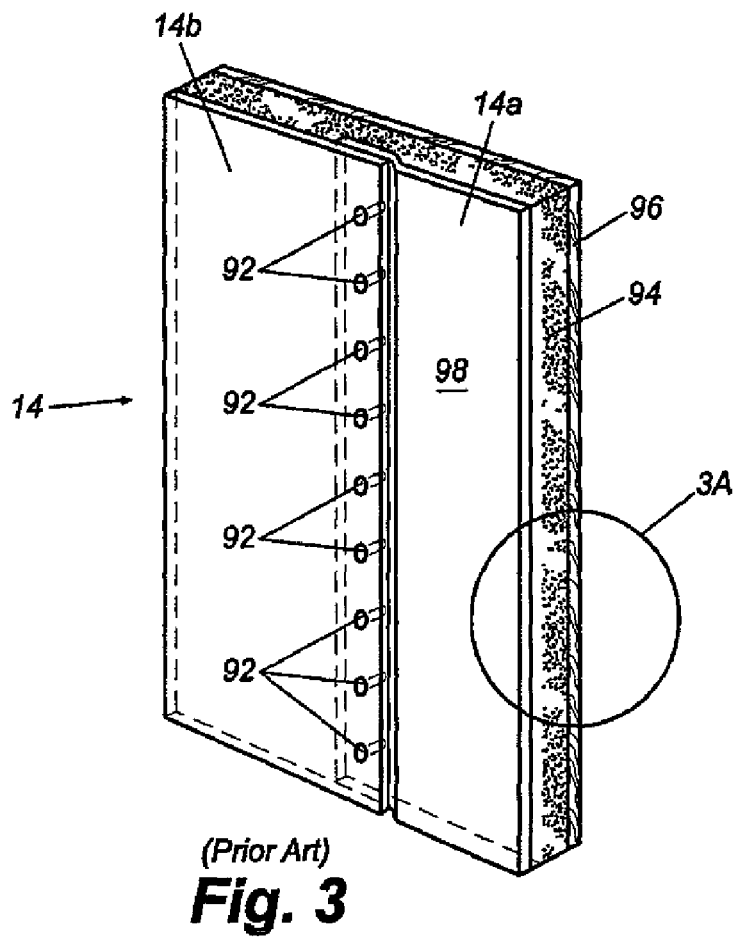
FIG. 3 is a perspective view of a prior art thermal wall panel used to construct the thermal container of FIG. 1 and the trailer of FIG. 1C.

Referring to FIG. 3, the side walls of the thermal compartment shown in FIGS. 1 and 1C are formed from a plurality of skins (FIG. 1) connected at 92 by screws, rivets, tapit pins, or other suitable connection method. FIG. 3 shows a pair of adjacent skin panels 14a and 14b that overlap at their edges and are secured together by rivets 92. The outer skin is fit together in this manner to form a continuous outer skin. To construct a thermal insulated wall panel, an inner liner panel 96 is spaced apart from outer skin 98, and thermal insulating foam is blown or poured into the channel between the outer skin and the inner liner panel. Fitted together in this manner, the outer skin, foam core and inner liner panel provide structural support to the side wall between the top and bottom rails, forming a "frameless" (or "monocoque") construction. In a post and panel construction, by contrast, each panel is attached by rivets or other suitable means to vertical posts that extend between the trailer's top and bottom rails. A post is disposed between each pair of adjacent panels so that both panels attach to the post. In either a composite panel or a sheet and post construction, the top and bottom of wall 14 are connected to top and bottom rails 20 and 22.

Outer skin 98 may be formed from plastic, aluminum, stainless steel or other metal alloy, and inner panel liner 96 typically is formed from a thermoset or thermoplastic glass reinforced composite. Examples of inner liner panel materials include polyester-based thermoset composites, such as Kemlite LTR or ARMORTUF available from Kemlite Company of Joliet, Ill., and polypropylene-based thermoplastic materials, such as BULITEX available from US Liner Company of Ambridge, Pa. As should be well understood, "thermoset" refers to a class of polymers that, when cured using heat, chemical or other means, change into a substantially infusible and insoluble material. Once cured, a thermoset material will not soften, flow, or distort appreciably when subjected to heat and/or pressure. "Thermoplastic," on the other hand, refers to a class of polymers that can be repeatedly softened by heating and hardened by cooling through a temperature range characteristic of the particular polymer and that in the softened state can be shaped. Whether thermoset or thermoplastic, the glass reinforced composite of liner panel 96 is generally known to be gas permeable with respect to the gas blowing agents entrapped in the foamed polymer used to form the insulating core.

Liners made from such gas permeable polymers are relatively lighter than liners made from sheets of known gas impermeable materials such as wrought aluminum or stainless steel. For example, a 0.020 inch thick stainless steel liner panel weighs about 0.84 lbs/sq.ft., and a 0.040 aluminum liner panel weighs about 0.56 lbs/sq.ft. In contrast, the Kemlite 0.090 inch, 25% glass material weighs about 0.51 lbs/sq.ft., and Kemlite's ARMORTUF® 0.050 inch liner panel weighs about 0.40 lbs/sq.ft. Typical thermoplastic liners, such as 0.100 inch BULITEX® and a 0.050 inch BULITEX, weigh about 0.78 lbs/sq.ft. and 0.32 lbs/sq.ft., respectively. Thus, while known thermoset and thermoplastic liner materials do not have the gas impermeability of metals, they are generally advantageous over metals since they are typically lighter and resilient.

Figure 3A:
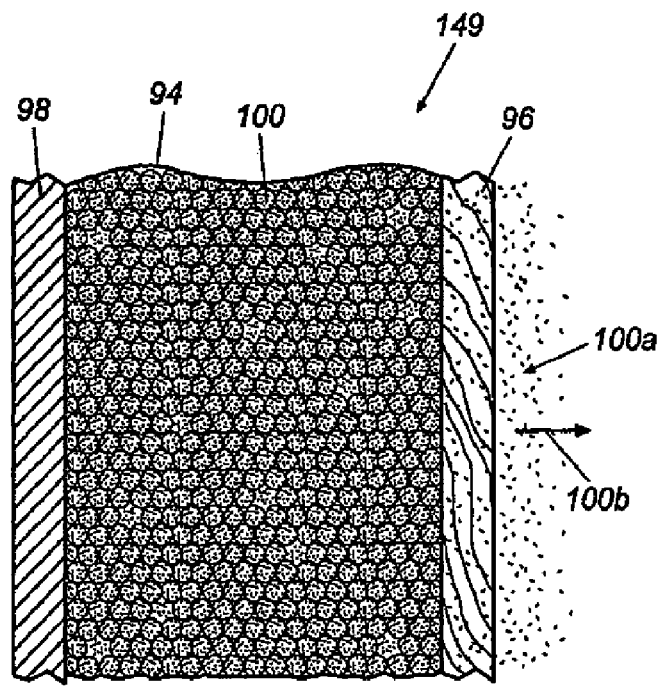
FIG. 3A is a detailed view, shown in cross-section, of the prior art thermal wall panel of FIG. 3 taken at region 3A.

FIG. 3A shows a detailed cutaway view of a portion of side wall panel 14a. Outer liner panel 98 is an aluminum layer about 0.04 inches thick, and inner liner panel 96 is a glass reinforced polymer composite material with a thickness in the range of about 0.060-0.100 inches. Polyurethane core 94 is preferably about 1.50 inches thick and tends to form a series of closed cells, in each of which is embedded a low thermal conductivity gas 100 such as CFC 141b, HCFC 22 or HFC 134a. Gas 100 is introduced into the core cells when the polyurethane foam in a liquid state is poured in place and reacts to form a rigid polyurethane insulating foam. As represented in FIG. 3A, impregnated gas 100 is distributed throughout the solid core material and generally represents approximately 98% of the core material, the remainder being the polyurethane cell walls surrounding the gas. It should be understood in this art that other thermal insulating core materials may be used to form the thermal insulated wall panels, such as STYROFOAM® (styrenic foams), PVC foams, or fiberglass batting.

Low conductivity gas 100 improves the thermal properties of wall 14, but over time the thermal insulating properties of side wall 14 degrades. Several factors influence the thermal conductance of the polyurethane foam core, for example the thermal conductivity of the cell gas, thermal conductivity of the cell material, convection of the cell gas and solar radiation. For purposes of this discussion, the main cause of thermal degradation in the core material results from migration (diffusion) of the cell gas out of the core and into the atmosphere ("out-gassing"), moisture (water vapor) and "air" (mostly $CO_2$) intrusion into the enclosed foam area, and from UV degradation of the polyurethane foam core.

Because the cell walls and inner liner panel 96 are gas permeable, out-gassing occurs over time as low-thermal conductivity gas 100 passes through both the cell walls and the inner liner panel, as indicated at 100a and the arrow identified as 100b. The loss of low thermal conductivity gas 100 significantly degrades the thermal insulation performance of the polyurethane foam over time.

In addition to out-gassing, water vapor intrusion through the polymer liner panel also degrades the thermal insulation performance of the polyurethane foam. That is, the polymer liner panel may have microscopic holes in the laminate due to manufacturing imperfections. Thus, for example, during pressure cleaning of the interior surface of the trailer or thermal compartment, water seeps through the holes or imperfections and impregnates the polyurethane foam core. Water absorption of one percent of the volume increases the thermal conductivity by approximately 0.0015 W mK, thereby increasing the thermal conductivity of the polyurethane core.

Some materials absorb UV light more readily than other materials, for example rubber, vinyls, gelcoat fiberglass, and many other plastics. Materials that readily absorb UV light are quickly damaged. For example, the performance of most thermoplastic materials depends largely on their molecular structure. A tough, resilient material will generally exhibit a structure in which the molecules are arranged in long, chain-like configurations. The absorption of UV light causes the molecular chains to break up (cleave) into shorter chains. This process, known as photodegradation, leads to bleaching (fading), discoloration, chalking, brittleness and cracking—all indications of UV deterioration. The bond cleavages resulting from UV absorption cause the formation of "radicals." Each free radical can trigger a chain of reactions (in the presence of air), leading to more bond cleavages and destruction. These oxidizing chain reactions require no further UV exposure, just the presence of air. Thermoset plastic materials are effected by UV in a similar manner to thermoplastics. Thus, UV light causes the polymers to break down expediting the effects of out-gassing.

Because metal is naturally gas, moisture and UV impermeable, out-gassing, water intrusion and UV degradation does not generally occur through the metal outer skin panel unless there are areas in the skin that have been compromised, such as by tears, holes or seams. Polyurethane foam cores and the causes of thermal degradation should be understood in this art and are therefore not discussed in detail herein. Further information may be found, for example, in the Polyurethane Handbook, published by Hanser Publishers and distributed by Macmillan Publishing Co., Inc. of New York, N.Y.

FIG. 4 is a graphical representation of the thermal insulation performance of various thermal wall constructions over time. Conductivity curve 104 represents a gas impregnated urethane core sandwiched between two gas permeable liner panels, such as panels formed from ARMORTUF or BULITEX. Conductivity curve 106 represents a gas impregnated urethane core sandwiched between one gas permeable liner panel and one gas impermeable liner panel, such as the prior art wall of FIG. 3. Finally, conductivity curve 108 represents a gas impregnated urethane core sandwiched between two gas impermeable liner panels, such as the wall construction described herein. The graph illustrates that the majority of thermal degradation occurs early in the useful life of the thermal-insulated trailer, which is approximately 10-12 years. Curve 108 illustrates that minimal degradation, about 5 percent, in thermal insulation occurs when both liner panels are formed from a gas impermeable material. That is, if both the inner and outer liner panels are formed from gas impermeable material, a low thermal conductivity is maintained, and little gas is leaked through joints in the inner or outer wall surfaces. Thus, in comparing curve 108 to curve 106, an approximately 20% greater thermal degradation occurs when one of the liner panels is formed from a gas permeable material, and in comparing curve 108 to 104, an approximately 35% greater thermal degradation occurs when both of the liner panels is formed from a gas permeable material.

One suitable gas, moisture and UV impermeable wall liner that overcomes the disadvantages of prior art thermoplastic, thermoset, and metal liner panels may be formed by a lamination process. As should be understood, a laminate is made by bonding together two or more sheets of distinct, usually man-made materials to obtain properties that cannot be achieved by the component materials acting alone. In the presently described example, the liner is formed through a consolidation process that includes heating and compressing multiple layers of thermoplastic and/or thermoset materials and then cooling the resultant laminate. In this example, the laminate has at least one gas impermeable barrier layer and at least one layer of a structural polymer material that provides the wall panel's strength and rigidity. The term "structural polymer" as used herein means a polymer that includes a reinforcement material such as fibers or a polymer that exhibits increased strength and toughness as a result of its molecular structure and the resulting intermolecular attraction forces. That is, by aligning the polymer molecules in a particular orientation, the molecule chains and intermolecular attraction forces increase the strength and toughness of the polymer without having to add a reinforcing material to the polymer. One example of such orientation is biaxial molecular orientation, which is well known by one skilled in the art.

FIGS. 5 and 5A illustrates one example of a material that may be used to form the structural polymer layer. A fabric 110 is formed from a plurality of woven rovings 112. Each roving 112 is formed from multiple substrands of commingled glass fibers 114 and polymer resin 116. That is, each roving 112 is comprised of two types of materials, i.e., glass fibers 114 and thermoplastic resin 116, intermingled into a single roving so that an even distribution of the two materials results. Other types of fibers may be used in the structural layer include Kevlar, carbon fiber, or natural fibers. In the preferred embodiment, polymer resin 116 is polypropylene, and each roving is generally long and essentially continuous. A polypropylene resin is a solid polymeric material that exhibits a tendency to flow when subjected to heat and pressure, usually has a softening or melting range, and is frequently used to bind together reinforcement fibers such as glass fibers. In a preferred embodiment, fabric 110 is a 22 oz./yard$^2$ TWINTEX® fabric, which is a 60% glass, 40% polypropylene plain balanced weave and is approximately 0.20 inches thick prior to consolidation, manufactured by Saint-Goban Vetrotex of Wichita Falls, Kans. Fabric 110 may alternatively be a non-woven material, for example a needle mat sold under the name ASGLAWO® by ASGLAWO GmbH of Freiberg, Germany. The non-woven mat is made of 30% E-Glass and 70% polypropylene. As should be understood, the added fibers are used to provide structural strength and toughness to the laminate material.

Figure 6:
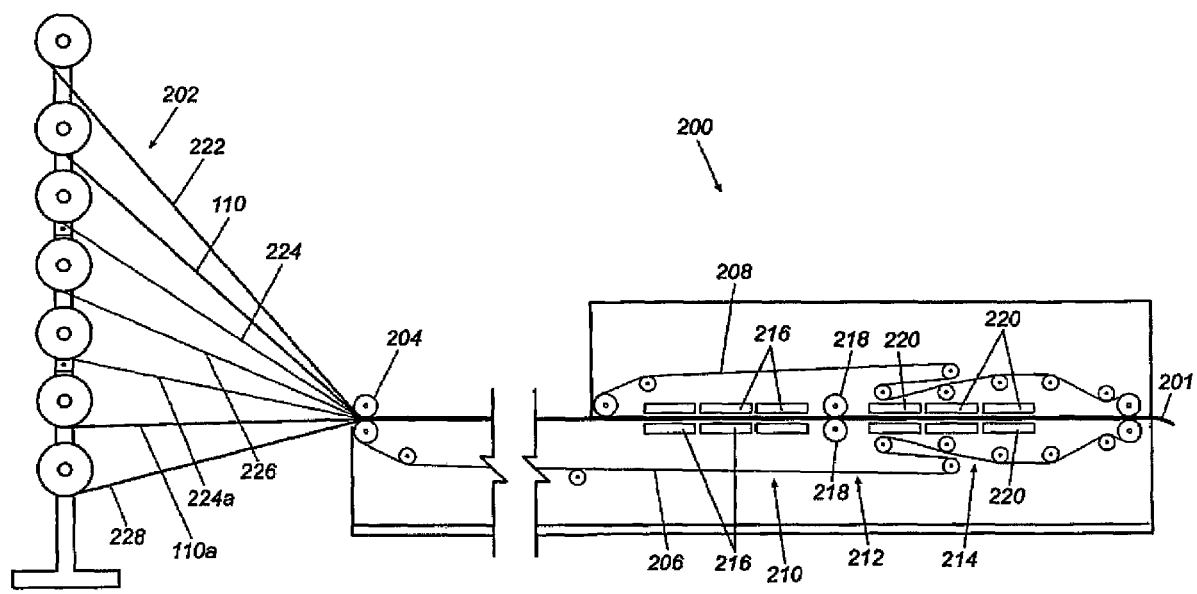
FIG. 6 is a schematic illustration of an apparatus for forming a liner panel in accordance with an embodiment of the present invention.

FIG. 6 schematically illustrates a machine 200 that consolidates a mat as shown in FIG. 5 with various other layers into a linear laminate panel in accordance with an embodiment of the present invention. That is, machine 200 applies heat and pressure to a multilayer material to fuse the thermoplastic raw materials into a relatively rigid sheet and to achieve a desired density in the laminate. Consolidation does not necessarily involve high temperatures or pressures, and in one preferred embodiment, consolidation can be achieved at a temperature between 200-225 degrees centigrade and a pressure range of 150 to 260 N-m per centimeter. One suitable consolidation machine 200 is a contact heat oven manufactured and sold by Schott & Meissner GmbH of Germany under the name THERMOFIX. FIG. 6 should be understood to be a representative schematic example provided for illustrative purposes, however, and other consolidation machines may be used to form the laminate of the present invention.

A rack 202 of machine 200 holds multiple rolls of material that are fed into a pair of guide rollers 204 driven by a lower belt 206 so that the layers are carried down stream into the machine on the lower belt. Each layer is coplanar with the adjacent upper and/or lower layers and is generally of the same length and width so that the resultant material has uniform properties throughout.

The raw materials that form the laminate are stored on large rolls in rack 202. FIG. 6 illustrates seven materials being fed coplanar into consolidator 200: a polypropylene surface film 222, woven fabric material 110, an adhesive film 224, a gas impermeable barrier film 226, a second adhesive film 224a, a second woven fabric 110a and a scrim layer 228. Each layer is approximately the same width and length as the other layers so that the resultant composite laminate is uniform from end to end. The consolidating machine of FIG. 6 can form a laminate sheet with a width of about 115 inches, and in a preferred embodiment, the laminate is about 96 to 100 inches wide.

In one preferred embodiment, barrier film 226 is formed from a thin layer of polyester thermoset material having a thin layer of metal deposited on its surface. The metal is deposited by placing a substrate (PET film) in to a chamber containing an atomized fog of molten aluminum vapor. As the substrate is uncoiled and removed from the vacuum chamber, a thin layer of aluminum is deposited onto the substrate. A suitable barrier film is a 92 gauge MB30 metallized polyethylene terephthalate (PET) film (manufactured and sold by Toray Plastics, Inc. of Front Royal, Va.), which has an aluminum layer at a thickness of about 24 µm. Although it is known that an aluminum layer is generally effective at providing a gas and moisture impermeable barrier at thicknesses greater than 50 µm, the 24 µm aluminum layer of the PET film provides an effective gas (as shown in FIG. 4) and moisture barrier Because fabrics 110 and 110a generally will not directly adhere to the thermoplastic or metal sides of film 226, adhesive films 224 and 224a, which are capable of bonding to both the thermoset material of barrier film 226 and to the thermoplastic material of the mats, are disposed between film 226 and mat 110 and between film 226 and mat 110a. Suitable adhesive films include a UAF polyurethane adhesive film and a PAF polyester based heat activated adhesive film, each manufactured by Adhesive Films, Inc. of Pine Brook, N.J. It should also be understood that other forms of adhesives can be used to bond barrier film 226 to mats 110 and 110a. For example, spray adhesive can be applied to the barrier film prior to being fed into guide rollers 204. In another example, barrier film 226 can be roll coated with adhesive prior to being fed into guide rollers 204. Barrier film 224 may also be modified to bond directly to mats 110 and 110a.

Surface film layer 222 forms a smooth protective outer layer to enhance cosmetic appeal and add longer life to the laminate. A suitable surface film layer 222 is XAMAX FLOVEILII® style 620 thermoplastic copolymer distributed by XAMAX Industries of Seymour, Conn. In the preferred embodiment, surface layer 222 is approximately 6 mils thick prior to consolidation.

Scrim layer 228 provides a relatively rough surface to which the polyurethane foam core may readily adhere. One suitable scrim material is ECOVEIL® PBT, which is a visible pattern bonded polyester distributed by XAMAX Industries, Inc. In the preferred embodiment, scrim layer 228 is approximately 6-8 mils thick prior to consolidation.

It should be noted that the above described materials are used in one preferred embodiment but that other suitable materials may be used. Other suitable gas impermeable barrier materials include, for example, metallized polypropylene films and metal foils, such as aluminum foil. In an embodiment employing foils, the laminate would include adhesive layers 224 and 224a to bond mats 110 and 110a to the foil layer. Alternate scrim materials are spunlaced polyester manufactured by Precision Fabrics Group, Inc. of Greensboro, N.C., glass fiber material or other rough material that does not melt or that melts at a temperature substantially higher than the other materials.

Returning to machine 200, belt 206 faces opposite a belt 208 so that the layers of material are sandwiched between the belts. Belts 206 and 208 are coated with a non-adherent releasing film surface, for example stainless steel, TEFLON or other suitable material, so that the laminate material easily releases from the belt at the end of the machine.

Belts 206 and 208 pass the layers through a heating stage 210, a calendar stage 212 and a cooling stage 214. Heating stage 210 includes pan type heating elements 216 that carry heated oil to conduct heat through belts 206 and 208 and into the input materials. The heating of mats 110 and 110a, polypropylene surface film layer 222 and scrim layer 228 causes the thermoplastic materials to flow so that added pressure by belt rollers 218 in calendar section 212 causes the scrim and surface film layers 228 and 222 to embed or mechanically bond with the polypropylene and glass fibers of the adjacent mat layers 110a and 110, respectively. The heat also causes adhesive films 224 and 224a to melt or activate, enabling thermoplastic materials 110 and 110a to bond to the polyester thermoset and metallized barrier layer 226.

The temperature of heating stage 210 is computer controlled to a level that causes the materials to flow and bond, but not liquefy. The control of pan type heating elements should be well understood and is, therefore, not discussed in detail herein. "Flow" is defined as the point where a thermoplastic reaches a semi-liquid state. Because not all thermoplastic materials reach a state of flow at the same temperature, the layered material should be heated to the highest flow temperature of the materials. Fabric 110 requires a consolidation temperature of at least 205 degrees centigrade and not more than 250 degrees centigrade to prevent the material from burning if the machine speed is very slow. Thus, in the preferred embodiment, the layered material is heated to a temperature of about 225 degrees centigrade so that all thermoplastic layers begin to flow, thereby allowing the layers to properly bond. As should be understood in this art, the ideal consolidation temperature varies depending on the machine speed, the number of layers being consolidated and the flow characteristics of the polymer.

Belt rollers 218 of calendar stage 212 apply sufficient pressure to the materials so that they bond to form a generally uniform laminate 201. The amount of pressure depends on the temperature of the input materials and the desired thickness of output laminate 201. In a preferred embodiment, the pressure exerted on the layered material is about 20-22 kN.

Once the materials have been consolidated, the soft pliable laminate 201 solidifies at cooling stage 214. The cooling stage employs cooling pans 220 that carry water to dissipate heat retained in the laminate. The temperature of the cooling water varies between 10 and 20 degrees centigrade depending on the number of layers in the laminate and the speed of the machine so that in a preferred embodiment, the laminate is cooled to a temperature of about 30 degrees centigrade. At 30 degrees centigrade, the laminate panel is stable and will not warp.

Consolidating machine 200 is able to form a continuous sheet of varying width and length of composite material that can then be rolled for storage. In the preferred embodiment, the laminate is formed in sheets about 102 inches wide and 500 feet long. The laminate may then be cut into desired sizes for gas impermeable liner panels to be used in the walls of refrigerated trailers, insulated containers, truck bodies or other thermally insulated structures, which may or may not be used in conjunction with vehicles, such as refrigerators, portable coolers, thermal-insulated buildings and walk-in-coolers.

Figure 7:
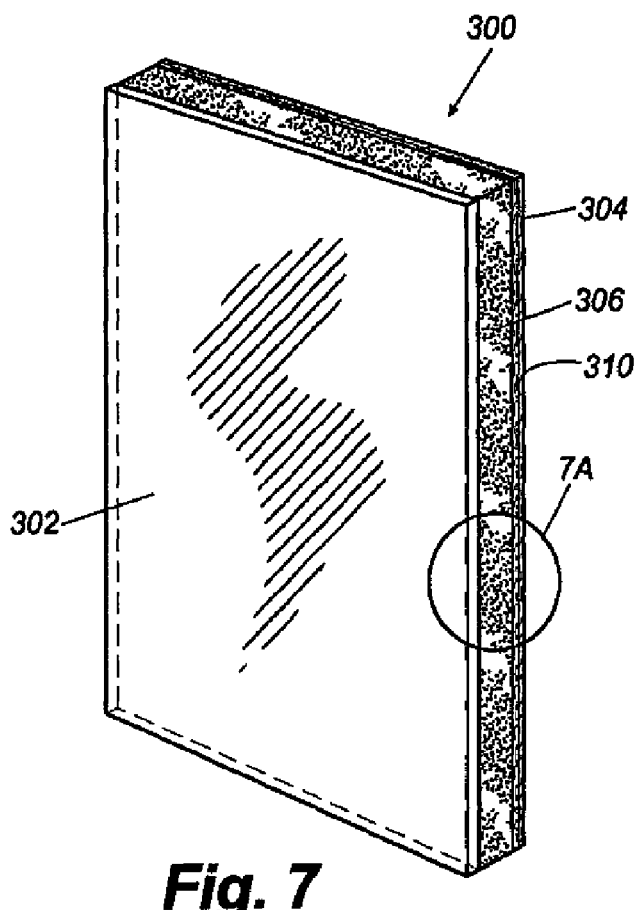
FIG. 7 is a perspective view of an embodiment of a thermal wall using the liner panel constructed in FIG. 6.
Figure 7A:
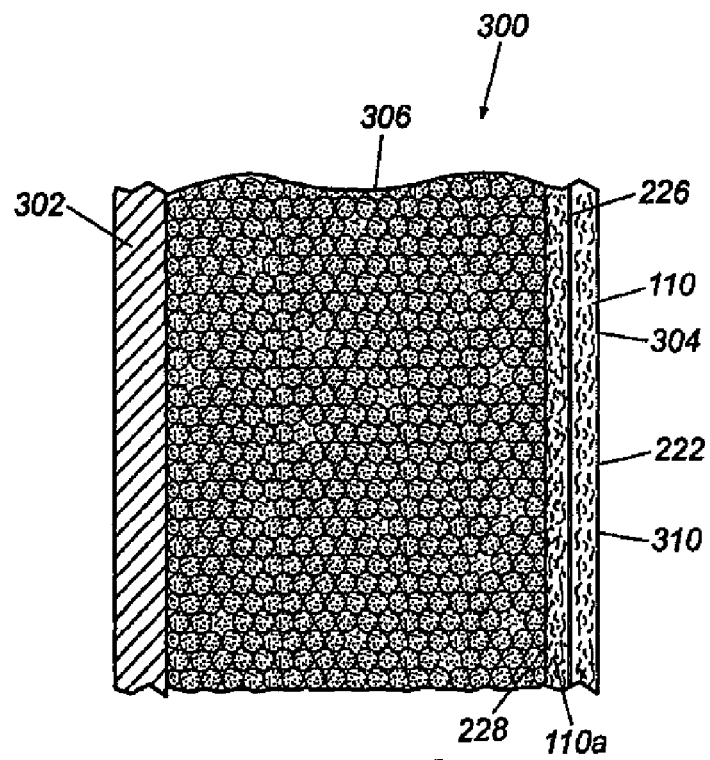
FIG. 7A is a detailed view, shown in cross-section, of the thermal wall of FIG. 7 taken at region 7A.

FIG. 7, for example, illustrates a wall panel 300 with a core and outer liner panel as in the panel shown in FIG. 3 but with an inner liner panel 304 that is a section cut from laminate 201 so that the gas-impregnated core is sandwiched between two gas, moisture and UV-impermeable liner panels. Referring to FIG. 7A, outer liner 302 is a gas, moisture and UV impermeable material such as aluminum, steel or other metallic material. Insulated core 306 is formed from gas impregnated rigid foamed polyurethane similar to that shown in FIG. 3A. Inner liner panel 304 is formed by the consolidation process described above and includes a scrim layer 228, a glass reinforced layer 110a, a barrier layer 226, a second glass reinforced layer 110 and a polypropylene surface film layer 222. Barrier layer 226 provides a gas, moisture and UV impermeable layer that eliminates out-gassing of the low thermal conductivity cell gas. The metallized film as described above also establishes a UV light and moisture barrier that inhibits degradation of the wall panel's insulating properties. The glass fiber reinforced layers 110 and 110a provide desired structural characteristics at a lighter weight than a solid metal liner. For example, in a preferred embodiment, composite laminate 201 has a thickness of about 0.070 inches and weighs about 0.30 lbs/sq.ft. compared to a 0.040 inch aluminum liner panel that weighs 0.56 lbs/sq.ft. Scrim layer 228 provides a rough surface at which to bond liner panel 304 to urethane core 306, and surface film layer 222 provides a smooth surface at the cargo area's interior.

Laminate 201 is flexible so that it maybe rolled for storage and shipment. Flexibility is not required, however, particularly where a thermoset material is used as the foundation layer. Where a flexible or non-flexible foundation material is used, the liner panel exhibits strength and stiffness within the plane of the liner panel itself. Stiffness is the ability to withstand a load without deforming, whereas strength is the ability to withstand the force of the load without breaking. By being stiff and strong within the plane of the material, the liner panel may contribute structural stability to a wall panel of a cargo vehicle or other structure in which a gas or vapor impermeable barrier is desired. Thus, for example, laminate 201 maybe used in a wall structure as shown in FIG. 7 in the side walls, front wall and roof of a frameless trailer as described above. A typical wall panel may need to withstand in-plane stresses within a range of 0.00 to 30,000 lbs/inch$^2$ of liner material from blows resulting from the loading and unloading of cargo.

Preferably, as in the case of laminate 201, the liner is "tough" and "resilient" in the direction normal to the liners plane. That is, it is strong, deformable and exhibits elasticity in a direction normal to the liner's face so that the liner is capable of regaining its original shape or position after deforming by a blow normal to the line's surface, for example as received from a lift truck, hand trucks, or falling cargo during loading or unloading of a trailer or cargo container. Thus, the liner panel should not be brittle.

As should be understood in this art, toughness is a characteristic of the material, whereas stiffness and strength are characteristics of the material and it geometry. Thus, because of liner panels planar geometry and its material characteristics, laminate 201 exhibits in-plane strength and stiffness and transverse toughness. More specifically, the glass fibers embedded in the foundation layer 110 and 110a of laminate 201 provide strength characteristics in both the in-plane and transverse directions, while the layered polymer composition provides transverse resiliency. The degree of desired in-plane stiffness and strength, and transverse flexibility, of a particular liner panel will depend upon how a particular liner panel such as laminate 201 is used.

Still referring to FIG. 7, it should be understood that while outer liner panel 302 and inner liner panel 304 are gas impermeable, out-gassing may still occur from areas where the integrity of the inner and outer liner panels have been compromised. For example, out-gassing may occur at rivet holes and seams where the wall panels are connected to adjacent wall panels or posts and/or at the top and bottom rails and at edges of the side wall or roof panels where the core is exposed. Thus, while the material forming the barrier layer is gas impermeable, the resulting liner panel and wall panel may be described as "substantially gas impermeable" due to penetration of the liner panel during construction of the trailer, container or other structure and/or to the construction of the particular panel. That is, as shown in FIG. 4, while curve 108 shows a substantial decrease in thermal degradation compared to wall constructions for curves 104 and 106, there is still some degradation in a wall constructed with two gas-impermeable liner panels. However, for practical purposes, the degradation is minimal, and the overall efficiency of the side walls, front wall and/or roof is substantially improved. Thus, as used herein with respect to a liner panel or barrier layer, the terms "substantially gas impermeable" mean that the panel or layer acts as a barrier to the transfer of a gas from one side of the panel to the other side. In an embodiment of the invention, a barrier or liner is substantially gas impermeable when the transfer of low conductivity gas at atmospheric conditions across the barrier or layer results in a thermal degradation curve approximate that of curve 108.

Referring again to FIGS. 1A-1C, the side walls, front wall and roof of a cargo compartment as shown in the figures may be formed using wall panels that include laminate 201. For purposes of this discussion, the term "cargo compartment" refers to the cargo area of a container, trailer or body of a straight truck for use with a wheeled chassis. For example, wall panels 14a and 14b shown in FIG. 3 may be manufactured to include the gas-impermeable liner panel as shown in FIG. 7. Therefore, multiple panels can be connected to form the side walls, front wall and/or roof of the container or trailer shown in FIG. 1. Additionally, the walls or roof may be formed from a single continuous panel that contains few or no seams, thereby reducing the number of areas that may cause out-gassing. Moreover, in addition to using composite laminate 201 as the inner surface of a wall or roof panel, composite laminate 201 can also be used as the outer liner panel for a wall, roof or floor panel to further reduce the overall weight of the container or trailer. The terms "wall panel" and "roof" are used separately in the present discussion for purposes of explanation, and it should be understood that the term "wall panel," as used herein, may refer to any side, top or bottom wall of an insulated or other structure in which a gas and/or vapor barrier is desired.

Figure 8:
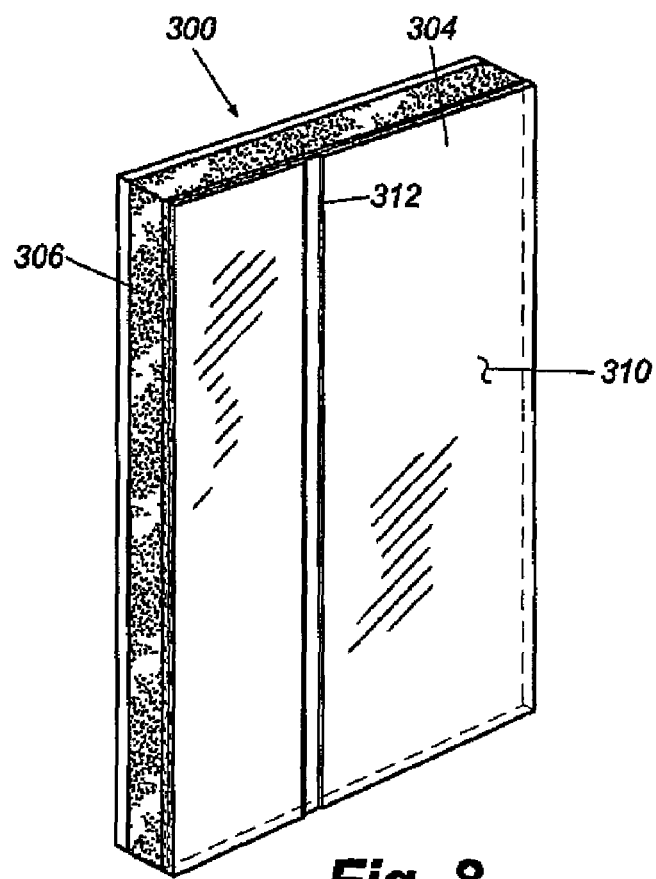
FIG. 8 is a perspective view of the thermal wall of FIG. 7, viewing the opposite side from that shown in FIG. 7.
Figure 9:
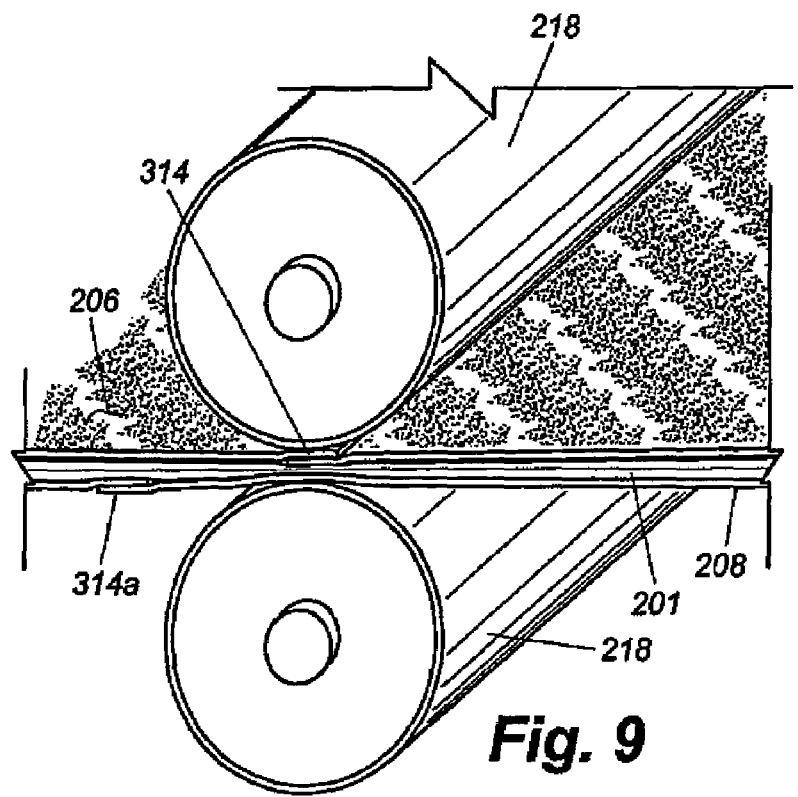
FIG. 9 is a partial perspective view of the apparatus of FIG. 6 showing the formation of the liner panel of FIG. 8.

Whether composite laminate 201 is used as the inner and/or outer liner panels for a wall or roof panel, the laminate's surface layer forms an exposed surface of the overall structure. Thus, for aesthetic reasons, surface film layer 222 preferably forms a smooth, easily cleanable surface. However, although most of the outer surface 310 is smooth and uniform, consolidating machine 200 (FIG. 6) forms a repeating surface blemish 312 on the outer surface 310 of inner liner panel 304, as shown in FIG. 8, formed by a seam 314 in belts 206 and 208, as shown in FIG. 9. That is, as belts 206 and 208 move the layered material through consolidator 200, belt splices 314 and 314a contact the outer and inner surface of the laminate and imprint blemish 312 at a regular frequency. Thus, the outer surface of inner liner panel 304, as well as the inner surface, contains a repeating seam imprint. One method of eliminating the blemish is to trim and throw away that portion of the composite laminate.

Figure 10:
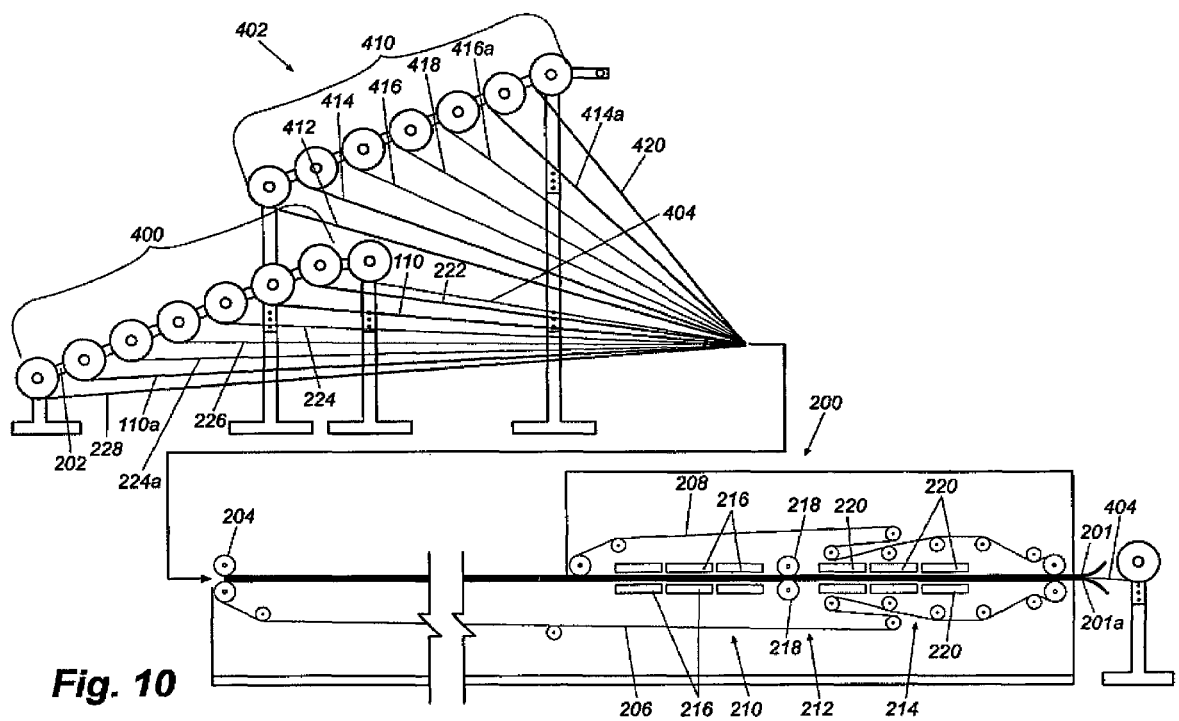
FIG. 10 is a schematic illustration of an apparatus for forming a liner panel in accordance with an embodiment of the present invention.

In an alternate embodiment of the consolidating system shown in FIG. 10, however, consolidating machine 200 is shown along with a modified material rack 402 that holds 15 rolls of input material. Similar to the consolidation process described above, a first multilayer group 400 of material includes a surface film layer 222, a glass reinforced polypropylene layer 110, an adhesive layer 224, a barrier layer 226, a second adhesive layer 224a, a second glass reinforced polypropylene layer 110a and a scrim layer 228. The layers are ordered so that scrim layer 228 contacts lower belt 206 while surface film layer 222 contacts a release material 404 also held on rack 402. A second multilayer group 410 includes a veil layer 412, a glass reinforced polypropylene layer 414, an adhesive layer 416, a barrier layer 418, a second adhesive layer 416a, a second glass reinforced polypropylene layer 414a and a scrim layer 420. The layers are ordered so that scrim layer 420 contacts upper belt 208 while surface layer 412 contacts release material 404. That is, release material 404 is sandwiched between first multilayer group 400 and second multilayer group 410 as they pass through consolidator 200. Consequently, belts 206 and 208, and their respective belt seams, never contact respective surface film layers 222 and 412. As a result, the consolidation machine does not impart a blemish on the surface 310 of liner panel 304 that is exposed to the interior of the finished insulated structure, and output production is doubled. Moreover, as laminates 201 and 201a exit the consolidation process, release film 404 may be wound onto a roller so that it can be stored and reused in a later consolidation. In a preferred embodiment, the release layer is a MB30 metallized PET film manufactured by Toray Plastics, Inc. Alternatively, the release layer may comprise a metal foil layer or a polymer such as MELINIX polyester produced DuPont Teijin Films U.S. Limited Partnership, 1 Discovery Drive, P.O. Box 411, Hopewell, Va. 23860.

It should also be understood that while a first and second material group is discussed above, a third material group may be added in a still further embodiment so that the belt seams do not imprint on any of the veil layers, while output production is tripled. That is, a release layer is placed intermediate each multilayered group, and the materials are ordered, so that the belt seams do not contact the veil layers. In yet another embodiment, a single material group may be fed into consolidator 200 with an additional release layer 404 added on top of surface film layer 222. That is, the surface layer would not contact the belt seam since it is protected by the release layer. Of course, there is a limit to the number of layers that can be consolidated during a given pass. For instance, the THERMOFIX® contact heat oven used in the above-described embodiment allows up to a 3/10 inch thick laminate(s) to be formed. However, other consolidation machines exist that allow for a greater number of layers that result in a thicker laminate.

It should also be understood that various layers may be eliminated from the consolidation process depending on the application of the laminate. For example, fabric layer 110*a* (FIG. 6) may be eliminated to reduce the number of layers forming laminate 201, although adhesive layer 224*a* may be retained to adhere the scrim layer to the barrier layer. At a minimum, in addition to the barrier layer, the laminate requires at least one structural layer and one adhesive layer, which may be the barrier layer.

Figure 11:
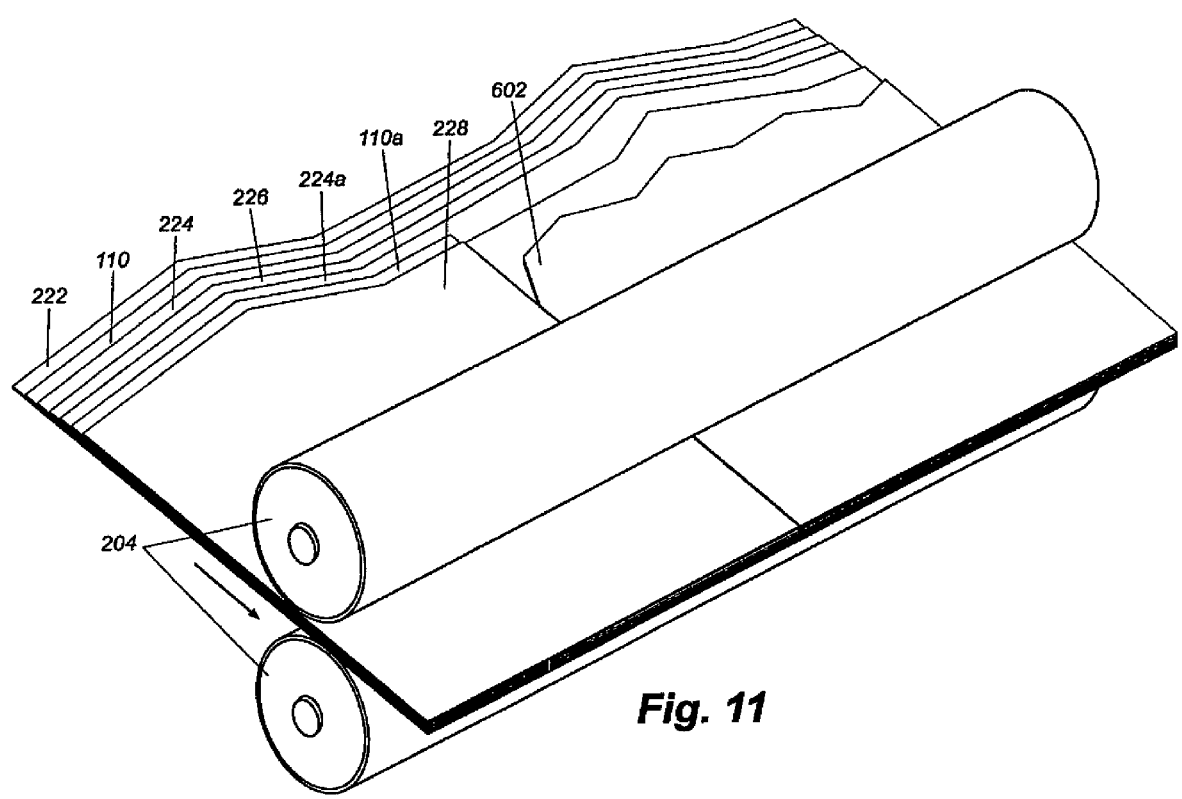
FIG. 11 is a perspective view of a liner panel in accordance with an embodiment of the present invention.
Figure 12:
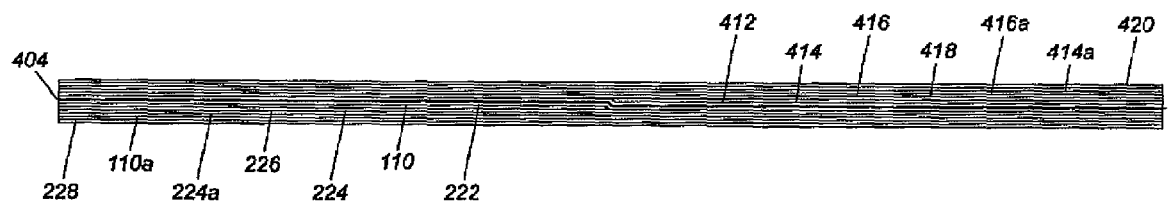
FIG. 12 is an elevation view of a liner panel in accordance with an embodiment of the present invention.

Besides eliminating an entire layer, portions of a layer can be eliminated or added. Referring to FIG. 11, for example, one-half of mat 110*a* is eliminated from the top half of the panel to lighten the weight of the overall wall panel structure while providing strength and rigidity at the lower half of the resultant wall panel. A shim layer 602 can be placed on top of layer 222 to cover the area where mat 110*a* was removed so that proper consolidation can be achieved. That is, shim 602 fills the void in the layered material so that the layered group has a uniform thickness as it is fed into machine 200. Moreover, as shown in FIG. 12, two laminate sheets can be formed by the process described in FIG. 10 when one-half of mat 110 and mat 414 is eliminated. In doing so, the layers are oriented so that a shim layer is not necessary. That is, one group of material is positioned so that half layer 110 is orientated to the opposite side of half layer 414 so that each half layer acts as a shim for the other group of material. Once consolidated, the two laminates separate due to release layer 404 and each has a portion of laminate having a thicker cross-sectional area at the bottom of the resultant laminate.

Referring back to FIG. 2, scuff plate 78 prevents damage to the lower portion of the wall when cargo is loaded into or removed from the trailer. If provided, the protective scuff plate generally protrudes into an otherwise useable storage area within the trailer. Thus, a scuff plate formed integral to the laminate inner liner panel provides the needed strength and rigidity to the wall while increasing useable storage area in the trailer. As shown in FIG. 13, an integral scuff plate may be formed by providing multiple layers of mat 110 at the lower one to two feet of the laminate. For example, during the consolidation process, multiple layers of mat 110*a* or 110 placed at the bottom edge portion of laminate 201 increases the thickness of the liner panel where it is most susceptible to impact. That is, multiple layers of mat 110 are placed proximate the lower portion of laminate 201 so that a thickened laminate portion forms an integral scuff plate 78, which protrudes into interior 46 of the trailer. A shim layer, as described in FIGS. 11-12 is used during the consolidation process to fill voids created by the partial layers. As shown in FIG. 13A, the laminate having an integral scuff plate can also be used to form a thermal insulated wall in a trailer or container.

Figure 14:
FIG. 14 is an elevation view of a liner panel in accordance with an embodiment of the present invention.
Figure 15:
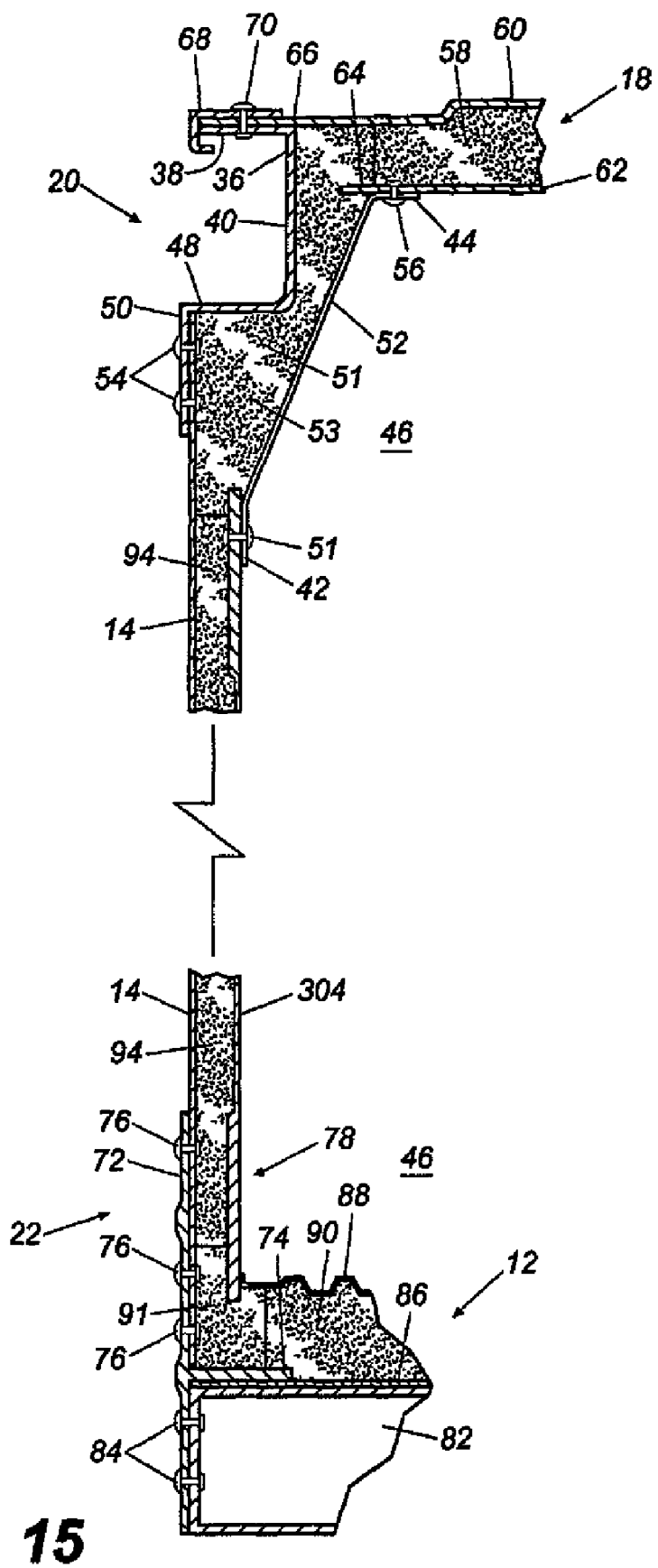
FIG. 15 is a sectional elevation view of a side of a trailer including the liner panel of FIG. 14.

In an alternative embodiment, where cargo space is an issue, multiple layers of 110*a* are used proximate the lower portion of laminate 201 so that the thickened scuff plate extends into the core and the outer surface of the liner panel is linear from top to bottom. In addition to placing extra glass reinforced polymer material at the bottom portion of the laminate, additional layers can also be added to the top portion of the laminate to provide added strength and stability at attachment points. As shown in FIG. 14, an additional layer of mat 110*a* at the upper and lower one-third of the structure provides additional strength and rigidity at critical areas of the wall panel, such as where they connect to the upper and lower rails. A shim 602 is placed intermediate the extra layers so that the layered material has a uniform thickness as it is fed into machine 200. As shown in FIG. 15, a liner panel with reinforced upper and lower portions can be used in a wall structure for a trailer and container. Besides reinforcing the upper and lower edges of the laminate, a reinforcing layer may also be located approximate the middle of the laminate to allow for structural attachments such as a logistic track or partition walls.

Figure 16:
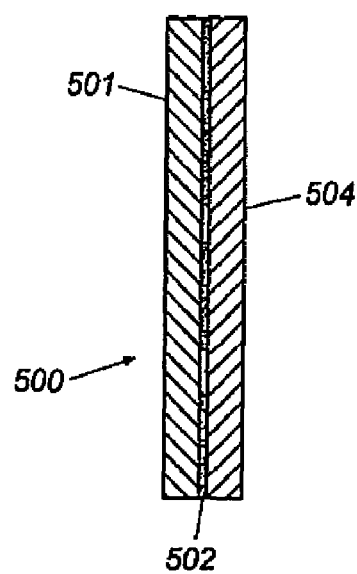
FIG. 16 is an elevation view, shown in cross-section, of a liner panel in accordance with an embodiment of the present invention.
Figure 16A:
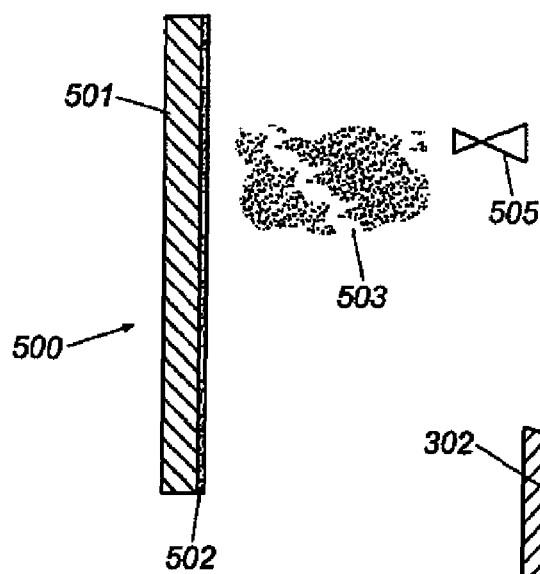
FIG. 16A is an elevation view, shown in cross-section, of a liner panel in accordance with an embodiment of the present invention.

The majority of the above discussion of adding a gas and moisture barrier layer to a laminate panel is directed to panels formed by heating and pressing multiple layers of thermoplastic and thermoset materials together. However, gas and moisture barrier layers may also be added to thermoset liner panel constructions. Referring to FIG. 16, for example, a glass reinforced thermoset liner panel 500 may be formed in any height and length. First, a glass reinforced thermoset layer 501 is formed using well known methods in the art, such as by pouring a thermoset material onto a moving belt and scattering glass fibers throughout the material. Next, a layer of aluminum or other metal 502 is bonded to an outer surface of glass reinforced thermoset layer 501 by spraying, sputtering or adhesively bonding the metal to the surface. This may be accomplished during the curing process or after the thermoset material has cured. For example, as shown in FIG. 16A, liquid aluminum 503 is sprayed onto one side of thermoset layer 501 by a sprayer 505 to form a uniform metallized layer 502. If, instead, a barrier film is used, a spray adhesive can be applied intermediate the barrier layer and thermoset layer to bond the barrier layer to the surface of thermoset layer 501. Suitable adhesives for bonding the barrier layer to the thermoset include acrylic and urethane liquid adhesives. After depositing the barrier layer, a second thermoset layer 504 (FIG. 16) can be poured over the barrier layer to sandwich the barrier layer within the thermoset composite panel. An additional adhesive layer may be necessary to bond the thermoset layer to the barrier layer. Other layers can be added to the thermoset composite, such as a scrim layer and a surface layer.

In yet another embodiment, the second layer 504 can be eliminated so that the barrier layer forms an outer surface of the glass reinforced thermoset liner panel, as shown in FIG. 16A. A scrim layer 228 (one of which is shown in FIG. 17A) can be bonded to the exposed surface of the barrier layer to provide a bonding surface for a polyurethane core 306. In addition to scrim layer 228, a surface layer 222 can be added to provide a desired texture to the outward facing surface of liner panel 500. For example, in the preferred embodiment, surface layer 222 is a TEDLAR film layer manufactured by DuPont of Buffalo N.Y.

In yet another embodiment, a thermoset composite panel can be formed by first forming two thermoset layers and adhesively bonding the two layers to opposite sides of a metallized barrier layer. For example, two ARMORTUF panels can be adhesively bonded to a metal or foil barrier layer. As should be understood in the art, other methods exist for forming a thermoset layer and are within the scope of the present invention.

Figure 17:
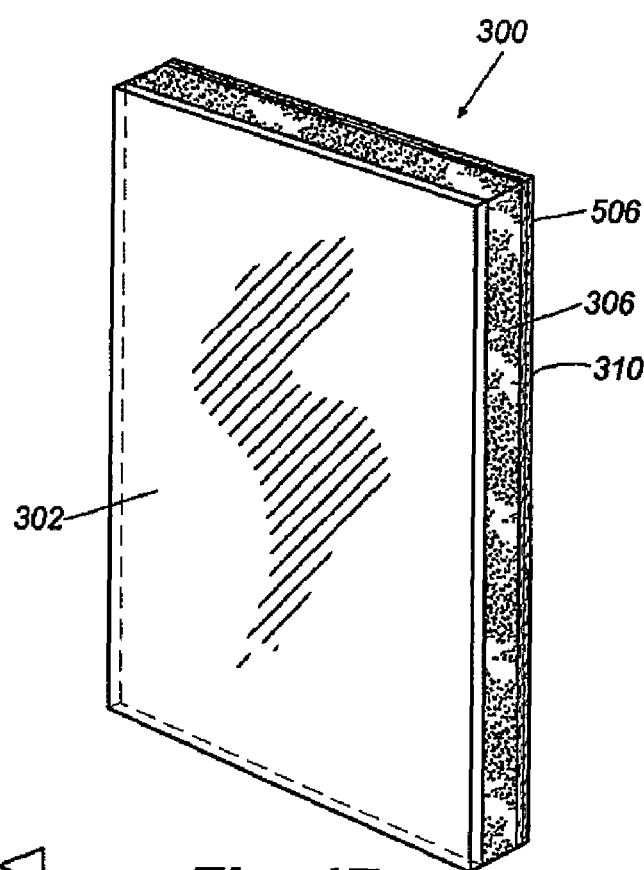
FIG. 17 is a perspective view of an embodiment of a thermal wall using the liner panel constructed in FIG. 12.
Figure 17A:
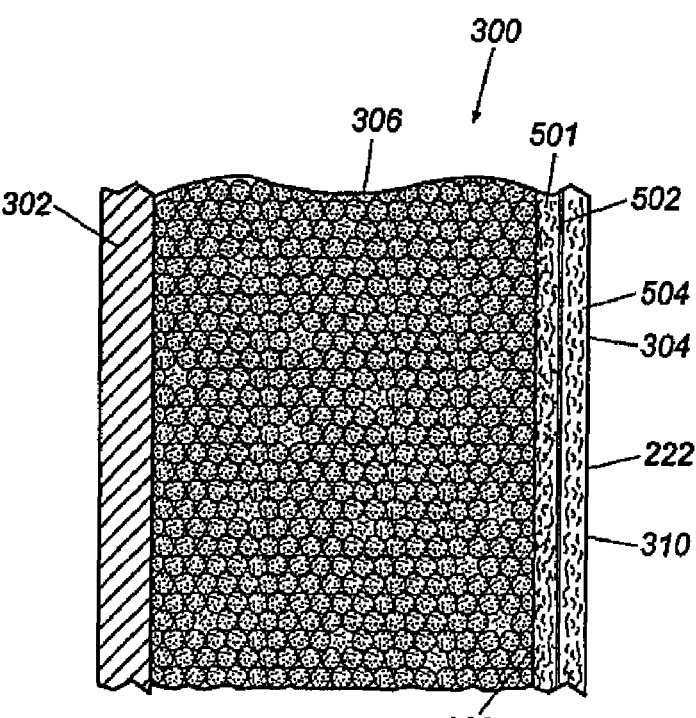
FIG. 17A is a detailed view, shown in cross-section, of the thermal wall of FIG. 13.

FIG. 17, illustrates a wall panel 300 with a core and outer liner panel as in the panel shown in FIG. 7, but with an inner liner panel 506 that is a section cut from laminate 500. Referring to FIG. 17A, outer liner 302 is a gas impermeable material such as aluminum, steel or other metallic or gas impermeable material. Insulated core 306 is formed from gas impregnated rigid polyurethane foam similar to that shown in FIG. 7A. Inner liner panel 506 is formed by providing a barrier layer 502 intermediate a first and second thermoset layer 501 and 504, respectively. The metallized barrier layer also establishes a light and moisture barrier that inhibits degradation of the wall panel's insulating properties. The glass reinforced thermoset layers provide desired structural characteristics at a lighter weight than a solid metal liner. For example, in a preferred embodiment, composite 304 has a thickness of about 0.055 to 0.075 inches and weighs about 0.40-0.50 lbs/foot$^2$ compared to a 0.040 inch aluminum liner panel that weighs 0.56 lbs/foot$^2$. As with the wall panel described in FIGS. 7 and 7A, the wall panel of FIGS. 17 and 17*a* can also be used to form the thermal insulated cargo trailer of FIG. 1A, van type trailer of FIG. 1C or other thermal insulated enclosure.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore it is contemplated that any and all such embodiments are included in the present invention as may fall within the literal and equivalent scope of the appended claims.

What is clamed is:

1. A method for forming a composite liner panel for use in a trailer, the method comprising the steps of:
   a. providing a liner surface for use as a wall of the trailer, a filler, and a first scuff band;
   b. placing the filler and the scuff band adjacent to the liner surface;
   c. adhering the liner surface to the first scuff band through a continuous lamination process, wherein the first scuff band includes a substantially uniform protruding surface, along at least a portion of a height of the liner surface, wherein the filler ensures a substantially uniform thickness to the composite liner panel during the continuous lamination process; and
   d. removing the filler to provide the composite liner panel with the first scuff band and the substantially uniform protruding surface.

2. The method of claim 1, wherein a portion of the protruding surface acts as a scuff pad.

3. The method of claim 1, wherein after step (a) further comprising the step of eliminating a portion of the first scuff band.

4. The method of claim 3, wherein one half of the first scuff band is eliminated.

5. The method of claim 1, wherein both the liner surface and the first scuff band of the composite liner panel are formed in the lamination process.

6. The method of claim 5, wherein the protruding surface is formed by the step of providing the filler to cover a portion of the first scuff band during said lamination step.

7. The method of claim 1, wherein the first scuff band extends substantially half the height of the liner surface.

8. The method of claim 1, further comprising the steps of:
   a. providing an inverted liner surface for use as a wall of the trailer and an inverted scuff band in an inverted orientation to the liner surface and the first scuff band, wherein the filler acts as the inverted scuff band;
   b. adhering the inverted liner surface to the inverted scuff band while adhering the liner surface to the first scuff band, wherein the inverted scuff band includes a protruding surface.

9. The method of claim 8, further comprising the step of providing a release layer having the liner surface and the scuff band on one side of the release layer and having the inverted liner surface and the inverted scuff band on another side of the release layer.

10. The method of claim 1, wherein the first scuff band is provided as a laminated mat layer.

11. The method of claim 10, further comprising the step of providing a plurality of laminated mat layers acting as a scuff pad.

12. The method of claim 11, wherein the scuff pad is formed by the step of providing the filler to cover a portion of the plurality of laminated mat layers.

13. The method of claim 11, wherein the plurality of laminated mat layers include the protruding surface, the protruding surface protruding towards the liner surface.

14. A method for forming a plurality of composite liner panels, at least one of the plurality of composite liner panels for use in a trailer, the method comprising the steps of:
   a. providing a first composite liner panel comprising the steps of:
      i. providing a first liner surface of a sidewall of the trailer and a first scuff band; and
      ii. adhering the first liner surface to the first scuff band through a continuous lamination process;
   b. providing a second composite liner panel comprising the steps of:
      i. providing an inverted liner surface for use as a sidewall of the trailer and an inverted scuff band; and
      ii. adhering the inverted liner surface to the inverted scuff band through the continuous lamination process; and
   c. providing a release material, wherein the release material is between the first composite liner panel and the second composite liner panel, providing the second composite liner panel in an inverted orientation to the first composite liner panel, the first composite liner panel and the second composite liner panel each including a scuff panel, wherein the scuff panel includes a substantially uniform thickened area.

15. The method of claim 14 wherein the first composite liner panel includes a scrim layer.

16. The method of claim 14 wherein the second composite liner panel includes a scrim layer.

17. The method of claim 14 wherein the first composite liner panel includes a barrier layer.

18. The method of claim 14 wherein the second composite liner panel includes a barrier layer.

19. The method of claim 14 further comprising the steps of:
   a. providing a first glass reinforced polypropylene layer, and
   b. adhering the first liner surface to the first glass reinforced polypropylene layer.

20. The method of claim 19 further comprising the steps of:
   a. providing a second glass reinforced polypropylene layer,
   b. adhering the first liner surface to the second glass reinforced polypropylene layer, and
   c. adhering the first scuff band to the second glass reinforced polypropylene layer.

21. The method of claim 20 further comprising the step of providing multiple layers of the second glass reinforced polypropylene layer to form an integral scuff plate.

22. The method of claim 21 wherein the multiple layers cover a portion of the second glass reinforced polypropylene layer.

23. The method of claim 21 further comprising the step of providing the inverted scuff band to fill voids created by the multiple layers.

24. The method of claim 19 further comprising the steps of:
a. providing a surface film layer,
b. adhering the surface film layer to the first glass reinforced polypropylene layer.

25. The method of claim 14 further comprising the steps of:
a. providing a third glass reinforced polypropylene layer,
b. adhering the inverted liner surface to the third glass reinforced polypropylene layer.

26. The method of claim 25 further comprising the steps of:
a. providing a fourth glass reinforced polypropylene layer,
b. adhering the inverted liner surface to the fourth glass reinforced polypropylene layer, and
c. adhering the inverted scuff band to the fourth glass reinforced polypropylene layer.

27. The method of claim 26 further comprising the step of providing multiple layers of the fourth glass reinforced polypropylene layer to form an integral scuff plate.

28. The method of claim 27 wherein the multiple layers cover a portion of the fourth glass reinforced polypropylene layer.

29. The method of claim 27 further comprising the step of providing the inverted scuff band to fill voids created by the multiple layers.

30. The method of claim 25 further comprising the steps of:
a. providing a surface film layer,
b. adhering the surface film layer to the third glass reinforced polypropylene layer.

31. The method of claim 14 wherein the first scuff band includes a protruding surface, along at least a portion of a height.

32. The method of claim 14 wherein the inverted scuff band includes a protruding surface, along at least a portion of a height.

* * * * *